US011920616B2

(12) United States Patent
Kouta

(10) Patent No.: US 11,920,616 B2
(45) Date of Patent: Mar. 5, 2024

(54) AIR CYLINDER

(71) Applicant: SMC CORPORATION, Tokyo (JP)

(72) Inventor: Naoki Kouta, Katsushika-ku (JP)

(73) Assignee: SMC CORPORATION, Tokyo (JP)

(*) Notice: Subject to any disclaimer, the term of this patent is extended or adjusted under 35 U.S.C. 154(b) by 0 days.

(21) Appl. No.: 17/576,071

(22) Filed: Jan. 14, 2022

(65) Prior Publication Data

US 2022/0243720 A1 Aug. 4, 2022

(30) Foreign Application Priority Data

Jan. 29, 2021 (JP) ................................ 2021-000281

(51) Int. Cl.
*F15B 15/24* (2006.01)
*F15B 15/14* (2006.01)

(52) U.S. Cl.
CPC .......... *F15B 15/24* (2013.01); *F15B 15/1471* (2013.01)

(58) Field of Classification Search
CPC .. F15B 15/1404; F15B 15/1471; F15B 15/24; F15B 15/28–2892
See application file for complete search history.

(56) References Cited

U.S. PATENT DOCUMENTS 7,225,722 B2 * 6/2007 Angue ................ F15B 15/1414 92/88
2008/0127817 A1 * 6/2008 Someya ................ F15B 15/148 92/163
2011/0126703 A1 * 6/2011 Terasaki ................ G01D 5/145 92/5 R

FOREIGN PATENT DOCUMENTS

JP 10-9211 A 1/1998

* cited by examiner

*Primary Examiner* — Abiy Teka
*Assistant Examiner* — Matthew Wiblin
(74) *Attorney, Agent, or Firm* — Oblon, McClelland, Maier & Neustadt, L.L.P.

(57) ABSTRACT

A stroke adjustment mechanism includes an adjustment block attached to a slide table and a stopper attached to a cylinder body. A side wall portion of the slide table includes three or more screw holes arranged in the moving direction of the slide table. Two adjustment block mounting bolts are inserted into the adjustment block and selectively screwed into adjacent screw holes of the plurality of screw holes.

2 Claims, 8 Drawing Sheets

10

AIR CYLINDER

CROSS-REFERENCE TO RELATED APPLICATIONS

This application is based upon and claims the benefit of priority from Japanese Utility Model Application No. 2021-000281 filed on Jan. 29, 2021, the contents of which are incorporated herein by reference.

BACKGROUND OF THE INVENTION

Field of the Invention

The present invention relates to an air cylinder having a slide table, and more particularly to an air cylinder capable of adjusting a stroke of the slide table.

Description of the Related Art

In respect of an air cylinder having a slide table slidably supported by a cylinder body, a mechanism for adjusting a stroke of the slide table has been known.

For example, JPH10-009211A discloses a fluid pressure actuator in which a stroke adjustment stopper is attached to a block that is attached to the side surface of a cylinder tube. The stroke adjustment stopper is made up from a stopper bolt and a nut. A block that can be brought into contact with the stopper bolt is disposed on the side surface of the slide table. In this fluid pressure actuator, the stroke of the slide table can be adjusted by adjusting the screwing amount of the stopper bolt with respect to the block of the cylinder tube.

When the stroke of the slide table is adjusted with such a stopper bolt, it is necessary to use a long stopper bolt in order to expand the adjustment range. However, if the length of the stopper bolt is increased, the stopper bolt tends to buckle and may be broken. Further, when the stopper bolt is made longer, the stopper bolt largely protrudes from an end portion of the cylinder tube.

SUMMARY OF THE INVENTION

An object of the present invention is to solve the above-described problems.

An air cylinder according to the present invention is provided with a slide table slidably supported by a cylinder body, and includes a stroke adjustment mechanism. The stroke adjustment mechanism includes an adjustment block attached to the slide table and a stopper attached to the cylinder body. The side wall portion of the slide table includes three or more screw holes arranged in the moving direction of the slide table. Two adjustment block mounting bolts are inserted into the adjustment block and selectively screwed into adjacent screw holes of the plurality of screw holes.

According to the air cylinder, the stroke of the slide table can be adjusted with the adjustment block. Therefore, the durability of the stroke adjustment mechanism is improved. Further, the stroke adjustment mechanism does not project largely from an end portion of the cylinder body.

An air cylinder according to the present invention includes a stroke adjustment mechanism including an adjustment block capable of changing a position at which the adjustment block is attached to a slide table, and a stopper attached to a cylinder body. Therefore, the durability of the stopper is improved, and the stopper does not project largely from an end portion of the cylinder body.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
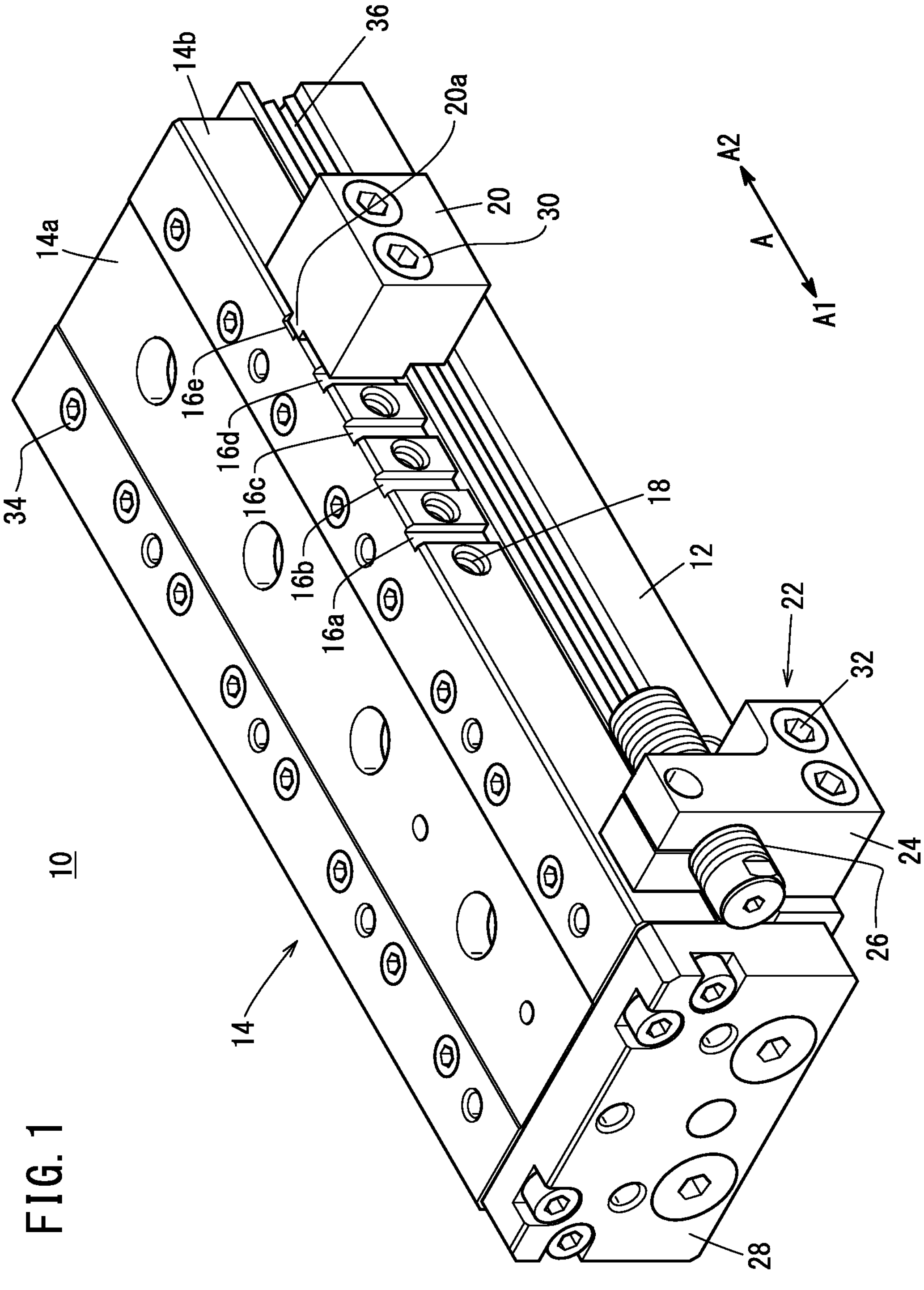
FIG. 1 is an external perspective view of an air cylinder according to a first embodiment of the present invention.

In the following description, when the terms in relation to the up and down directions are used, for the sake of convenience, such terms refer to the directions shown in the drawings, however, the actual arrangement of the respective component members is not necessarily limited to this feature.

First Embodiment

An air cylinder 10 according to a first embodiment of the present invention will be described with reference to FIGS. 1 to 6. The air cylinder 10 includes a slide table 14 slidably supported by a cylinder body 12 with a linear guide mechanism (not shown). The air cylinder 10 also has a stroke adjustment mechanism. The stroke adjustment mechanism includes an adjustment block 20 attached to the slide table 14 and a stopper 22 attached to the cylinder body 12.

A piston (not shown) driven by supply and discharge of air is disposed inside the cylinder body 12. An end plate 28 is connected to an end of a piston rod (not shown) that moves integrally with the piston. The slide table 14 is connected to the end plate 28. The slide table 14 is a member having a U-shaped cross section. The slide table 14 includes a flat plate portion 14*a* having a rectangular shape in a plan view and a pair of side wall portions 14*b*. The pair of side wall portions 14*b* project downward from a pair of opposite side edges of the flat plate portion 14*a*.

One side wall portion 14*b* of the slide table 14 has a plurality of positioning slits 16*a* to 16*e* formed by recesses extending in the vertical direction. The plurality of positioning slits 16*a* to 16*e* are arranged at equal intervals in the longitudinal direction of the side wall portion 14*b* that coincides with the moving direction (A direction) of the slide table 14. The side wall portion 14*b* has a screw hole 18 going through the side wall portion 14*b* between the adjacent positioning slits 16*a* to 16*e* and on outer sides with respect to the positioning slits 16*a* and 16*e* located at both ends. In other words, each of the positioning slits 16*a* to 16*e* are disposed between the adjacent screw holes 18. These screw holes 18 are arranged in the longitudinal direction of the side wall portion 14*b* at the same intervals as the positioning slits 16*a* to 16*e*.

The total number of screw holes 18 is one more than the total number of positioning slits 16*a* to 16*e*. In the present embodiment, five positioning slits 16*a* to 16*e* and six screw holes 18 are provided, but two or more positioning slits and three or more screw holes 18, being one more than the number of positioning slits, suffice. Reference numeral 34 denotes a bolt for attaching a guide rail constituting a part of the guide mechanism to the slide table 14. Reference numeral 36 denotes a groove for mounting a position sensor provided for the cylinder body 12.

One side surface of the adjustment block 20 having a rectangular parallelepiped shape is provided with a convex portion 20*a* that can be selectively fitted to one of the plurality of positioning slits 16*a* to 16*e*. The adjustment block 20 has a pair of insertion holes 20*b* going through the adjustment block 20 on both sides of the convex portion 20*a*.

The convex portion 20*a* of the adjustment block 20 is fitted into a positioning slit selected from the plurality of positioning slits 16*a* to 16*e*. Two adjustment block mounting bolts 30 are inserted into the insertion holes 20*b* of the adjustment block 20. The two adjustment block mounting bolts 30 are selectively screwed into the adjacent screw holes 18 of the side wall portion 14*b* of the slide table 14. As a result, the adjustment block 20 protrudes sideward from the side wall portion 14*b* and is fixed to the slide table 14. In this manner, the adjustment block 20 is attached to one side wall portion 14*b* of the slide table 14 in such a manner that the attachment position of the adjustment block 20 can be changed in the longitudinal direction of the slide table 14.

The stopper 22 includes a support block 24 and an adjustment bolt 26 attached to the support block 24. The support block 24 is attached to the side surface of the cylinder body 12 with a support block attachment bolt 32. The adjustment bolt 26 is supported by the support block 24 such that the axis of the adjustment bolt 26 is oriented in the direction of movement of the slide table 14. The tip end of the adjustment bolt 26 protrudes from the support block 24 toward the adjustment block 20 and can contact the front surface (a side surface facing in the A1 direction) of the adjustment block 20. When the adjustment block 20 contacts the adjustment bolt 26 in accordance with the movement of the slide table 14 in the A1 direction, the movement of the slide table 14 is restricted.

The length the tip of the adjustment bolt 26 protrudes from the support block 24 can be adjusted by adjusting the amount of screwing of the adjustment bolt 26 with respect to the support block 24. The projection length of the adjustment bolt 26 can be adjusted in a range of substantially the same length as the interval between the positioning slits 16*a* to 16*e* for the adjustment block 20. That is, the difference between the maximum projection length and the minimum projection length of the adjustment bolt 26 is substantially equal to the interval between the positioning slits 16*a* to 16*e*.

This setting is made in consideration of the fact that the stroke adjustment of the slide table 14 with the adjustment block 20 is limited to a stepwise adjustment in which the interval between the positioning slits 16*a* to 16*e* is a minimum unit. That is, this setting is made to make it possible to adjust the stroke of the slide table 14 in a stepless manner while minimizing the share of the stroke adjustment performed by the adjustment bolt 26. Thus, the length of the adjustment bolt 26 can be made as short as possible and the strength thereof can be increased. Moreover, it is possible to reduce the length in which the rear end of the adjustment bolt 26 protrudes from the support block 24 in the A1 direction. The stopper 22 may include a rotation stop nut for the adjustment bolt 26.

When the convex portion 20*a* of the adjustment block 20 is fitted into the positioning slit 16*e* at the end in the A2 direction among the five positioning slits 16*a* to 16*e* and the projection length of the adjustment bolt 26 is a minimum, the stroke of the slide table 14 is a maximum. Further, when the convex portion 20*a* of the adjustment block 20 is fitted into the positioning slit 16*a* at the end in the A1 direction among the five positioning slits 16*a* to 16*e* and the projection length of the adjustment bolt 26 is a maximum, the stroke of the slide table 14 is a minimum.

Accordingly, the stroke of the slide table 14 can be adjusted in a stepless manner in a range obtained by adding the second length to the first length described below. The first length is a distance from the positioning slit 16*a* at the end in the A1 direction to the positioning slit 16*e* at the end in the A2 direction. The second length is the difference between the maximum projection length and the minimum projection length of the adjustment bolt 26. Let n be the number of positioning slits and D be the spacing between the positioning slits. In a case where the difference between the maximum projection length and the minimum projection length of the adjustment bolt 26 is equal to the spacing between the positioning slits, the stroke of the slide table 14 can be continuously adjusted within the range of the length D×n.

Hereinafter, the operation of the air cylinder 10 according to the present embodiment configured as described above will be described.

Figure 2:
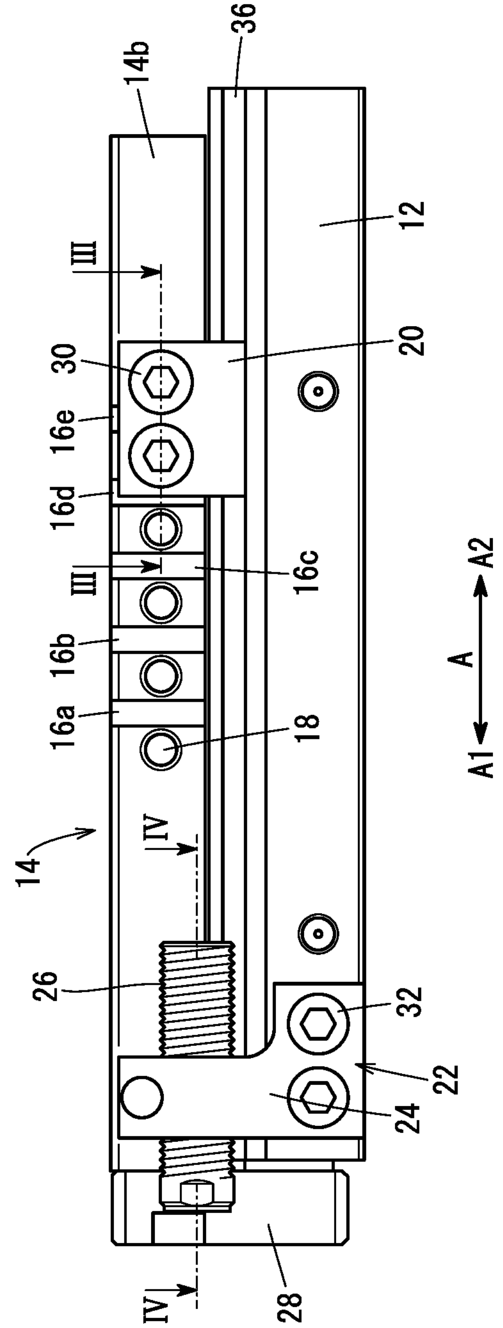
FIG. 2 is a side view of the air cylinder of FIG. 1.
Figure 3:
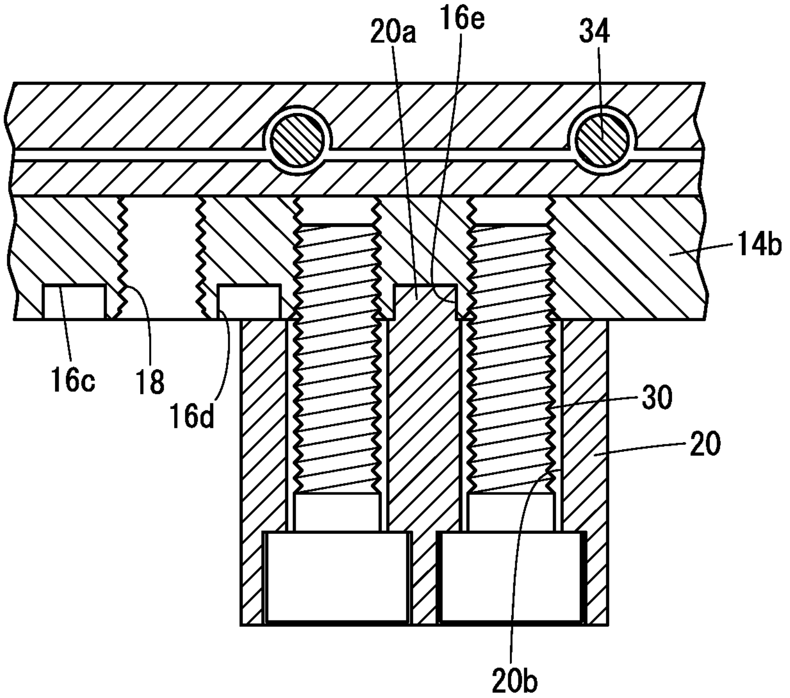
FIG. 3 is a cross-sectional view of the air cylinder of FIG. 1 when the side wall portions of an adjustment block and a slide table are cut along the line III-III of FIG. 2.
Figure 4:
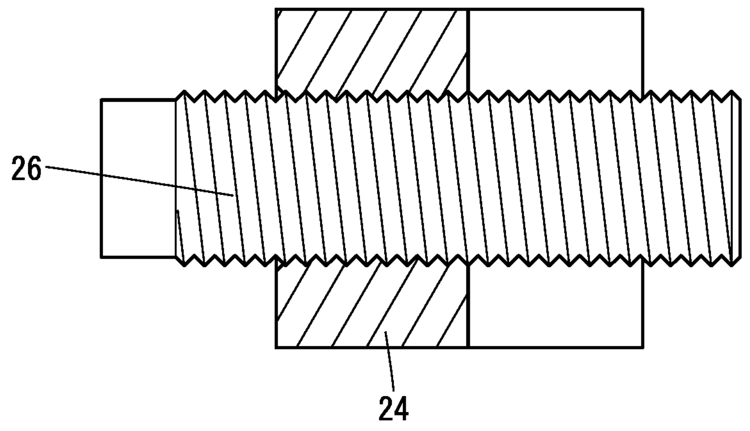
FIG. 4 is a cross-sectional view of the air cylinder of FIG. 1 when a stopper is cut along the line IV-IV of FIG. 2.
Figure 5:
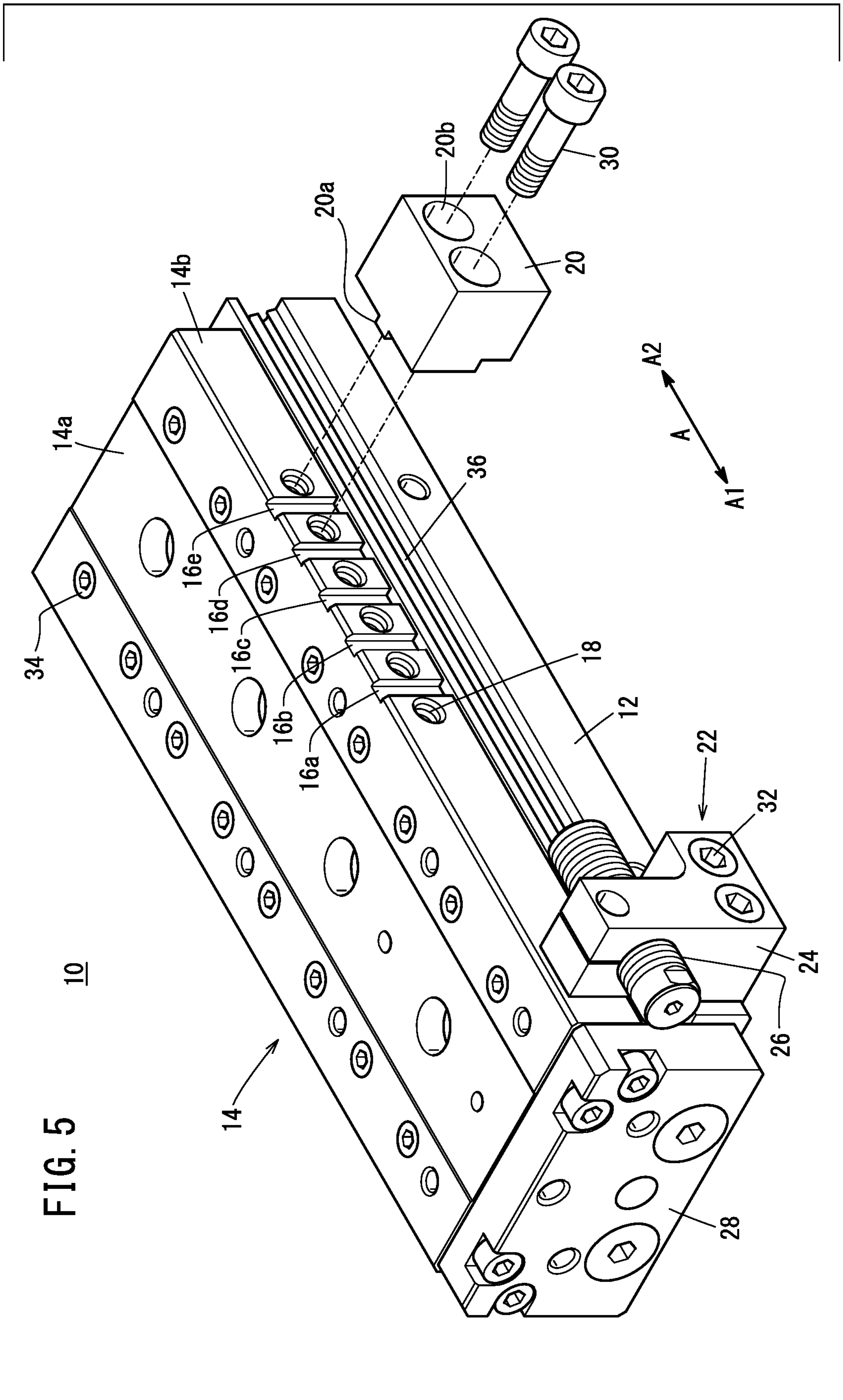
FIG. 5 is a view showing a state in which the adjustment block is removed from the air cylinder of FIG. 1.

In FIGS. 1 and 2, the convex portion 20*a* of the adjustment block 20 is fitted to the positioning slit 16*e* at the end in the A2 direction among the five positioning slits 16*a* to 16*e*. In addition, the projection length of the adjustment bolt 26 is neither minimum nor maximum. Further, the piston rod is at a position where it is most drawn into the cylinder body 12. That is, the slide table 14 is located at the moving end in the A2 direction.

Figure 6:
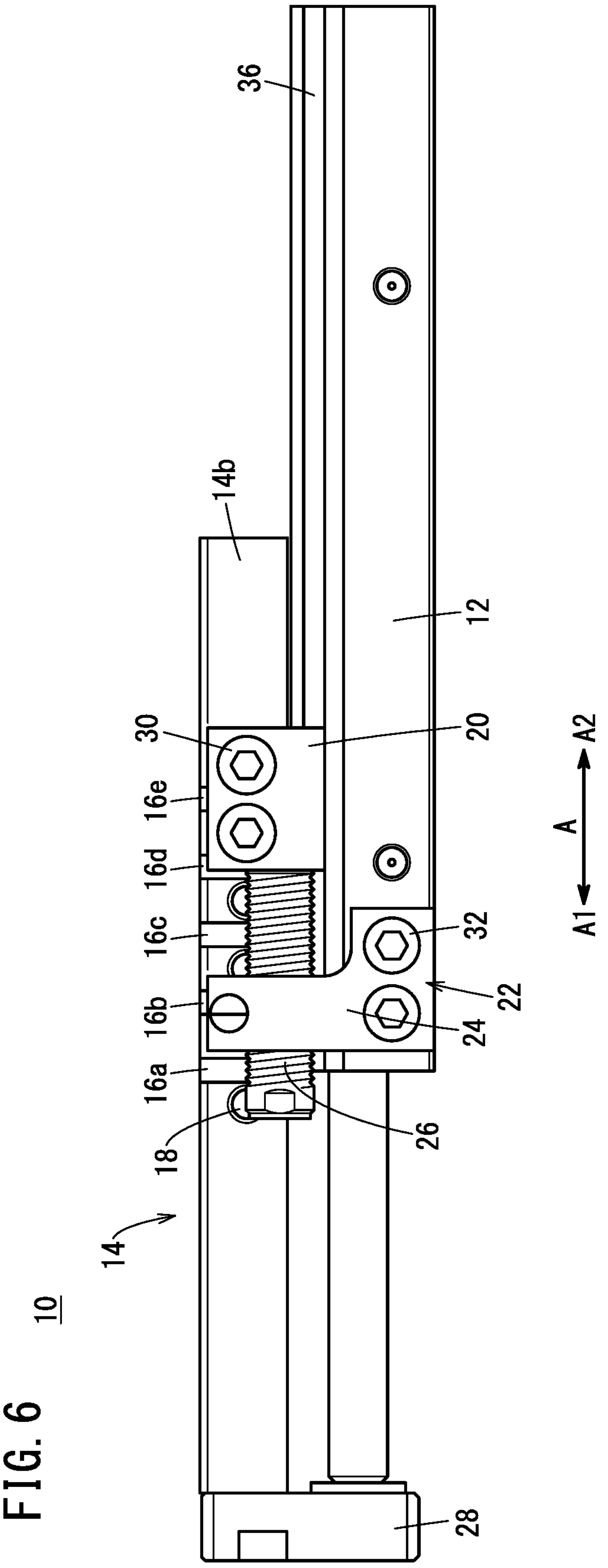
FIG. 6 is a side view of the air cylinder of FIG. 1 when the slide table is moved to a protruding end.

From this state, when air is supplied and discharged to drive the piston in the forward direction (A1 direction), the piston rod is driven in the extrusion direction. As a result, the slide table 14 moves in a direction in which it protrudes from the cylinder body 12. When the slide table 14 moves in the A1 direction by a predetermined amount, as shown in FIG. 6, the adjustment block 20 attached to the slide table 14 comes into contact with the adjustment bolt 26 of the stopper 22. Thus, the slide table 14 reaches the moving end in the A1 direction.

In this case, the stroke of the slide table 14 is such that the convex portion 20*a* of the adjustment block 20 is fitted into the positioning slit 16*e* at the end in the A2 direction. Therefore, the stroke of the slide table 14 is close to the maximum value. When it is desired to finely adjust the stroke of the slide table 14 from this setting state, the amount of screwing of the adjustment bolt 26 with respect to the support block 24 is adjusted.

When it is desired to change the stroke of the slide table 14 within a range exceeding a fine adjustment, the adjustment block 20 is temporarily removed from the slide table

14. Then, one of the other positioning slits 16*a* to 16*d* is selected, the convex portion 20*a* of the adjustment block 20 is fitted into the selected slit, and the adjustment block 20 is fixed to the slide table 14 again.

The air cylinder 10 according to this embodiment has a stroke adjusting mechanism including the adjustment block 20 capable of changing a position to be attached to the slide table 14 and the stopper 22 attached to the cylinder body 12. Therefore, the durability of the adjustment bolt 26 is improved, and the adjustment bolt 26 does not project largely from the end portion of the cylinder body 12.

In this embodiment, the stroke of the slide table 14 can be finely adjusted by using the adjustment bolt 26. However, for example, when the interval between the positioning slits is sufficiently small, it is not necessary to use the adjustment bolt 26. In this case, for example, a stopper pin may be simply fixed to the support block 24.

Second Embodiment

Figure 7:
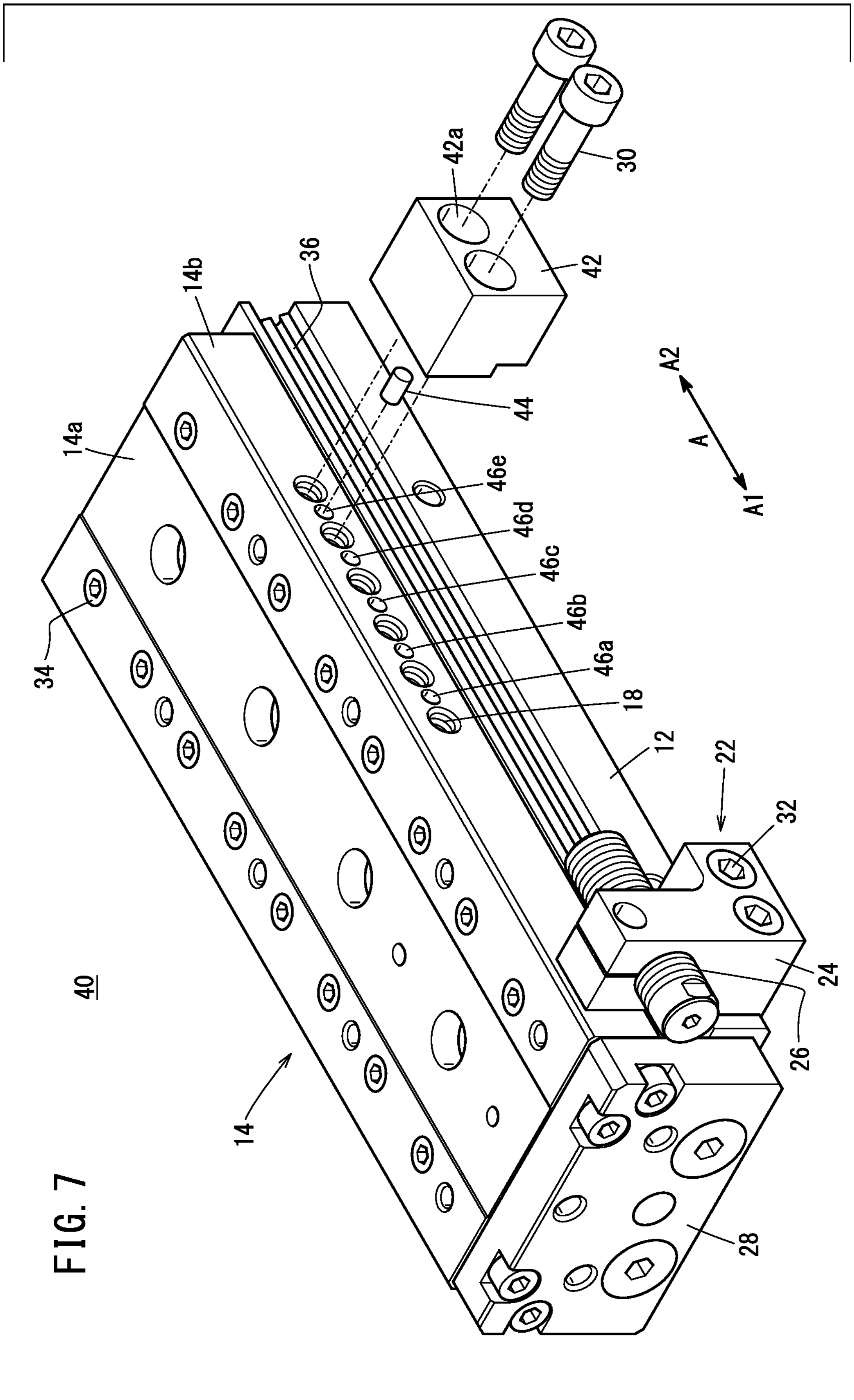
FIG. 7 is an external perspective view of an air cylinder according to a second embodiment of the present invention, showing a state in which an adjustment block is removed.
Figure 8:
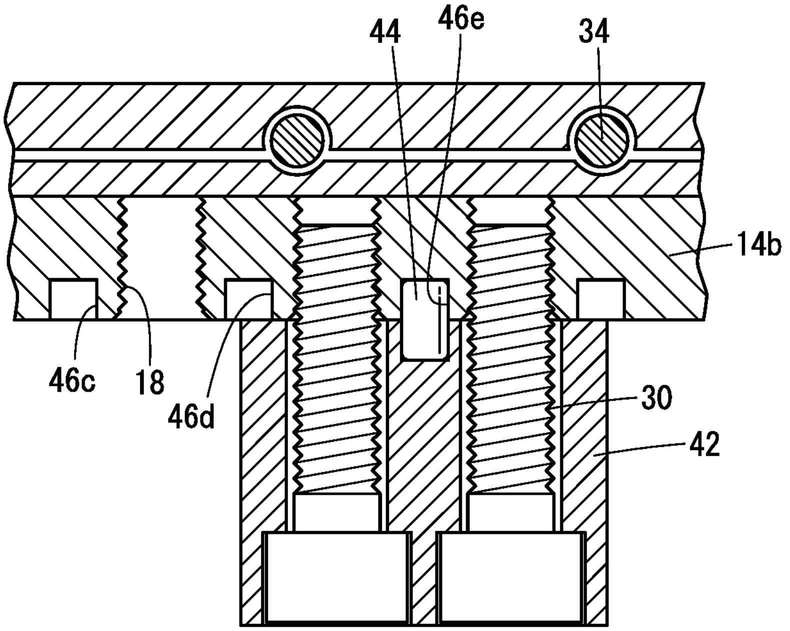
FIG. 8 is a cross-sectional view of the air cylinder shown in FIG. 7 when the side wall portions of an adjustment block and a slide table are cut.

Next, an air cylinder 40 according to a second embodiment of the present invention will be described with reference to FIGS. 7 and 8. The second embodiment differs from the first embodiment in the positioning means of the adjustment block with respect to a side wall portion of the slide table. Components identical or equivalent to those of the air cylinder 10 are denoted by the same reference numerals, and detailed description thereof will be omitted.

One side wall portion 14*b* of the slide table 14 has a plurality of positioning holes 46*a* to 46*e*. The plurality of positioning holes 46*a* to 46*e* are arranged at equal intervals in the longitudinal direction of the side wall portion 14*b*. The side wall portion 14*b* has a screw hole 18 passing through the side wall portion 14*b* between the adjacent positioning holes 46*a* to 46*e* and on an outer side with respect to the positioning holes 46*a* and 46*e* at both ends. In other words, the positioning holes 46*a* to 46*e* are disposed between the adjacent screw holes 18. These screw holes 18 are arranged in the longitudinal direction of the side wall portion 14*b* at the same intervals as the positioning holes 46*a* to 46*e*.

One side surface of the rectangular parallelepiped adjustment block 42 includes a spring pin 44, which can be selectively fitted into one of the plurality of positioning holes 46*a* to 46*e*. The spring pin 44 is formed by bending a thin plate into a cylindrical shape. The spring pin 44 is driven into a hole formed on the side surface of the adjustment block 42 and is fixed to the hole. The adjustment block 42 has a pair of insertion holes 42*a* extending through the adjustment block 42 on both sides of the spring pin 44.

A spring pin 44 protruding from the adjustment block 42 is fitted into one of the positioning holes 46*a* to 46*e* selected. Then, the two adjustment block mounting bolts 30 are inserted into the insertion holes 42*a* of the adjustment block 42. The two adjustment block mounting bolts 30 are selectively screwed into the adjacent screw holes 18 of the side wall portion 14*b* of the slide table 14. In this manner, the adjustment block 42 is attached to one side wall portion 14*b* of the slide table 14 in such a manner that the attachment position thereof can be changed in the longitudinal direction thereof.

The air cylinder 40 according to this embodiment has a stroke adjusting mechanism including an adjustment block 42 capable of changing a position to be attached to the slide table 14 and a stopper 22 attached to the cylinder body 12. Therefore, the durability of the adjustment bolt 26 is improved, and the adjustment bolt 26 does not project largely from the end portion of the cylinder body 12. The adjustment block 42 is positioned with the spring pin 44 fixed to the adjustment block 42 and a plurality of positioning holes 46*a* to 46*e* provided in the side wall portion 14*b* of the slide table 14. Therefore, the configuration of the positioning means can be simplified.

The present invention is not limited to the above-described embodiment, and various configurations can be adopted without departing from the gist of the present invention.

What is claimed is:

1. An air cylinder provided with a slide table slidably supported by a cylinder body, the air cylinder comprising:

a stroke adjustment mechanism including an adjustment block attached to the slide table; and a stopper attached to the cylinder body, wherein a side wall portion of the slide table includes a plurality of screw holes arranged in a moving direction of the slide table, a number of the plurality of screw holes is three or more, and two adjustment block mounting bolts are inserted into the adjustment block and selectively screwed into adjacent screw holes among the plurality of screw holes, wherein:

the side wall portion of the slide table includes a plurality of positioning slits respectively provided between the screw holes adjacent to each other, and the adjustment block includes a convex portion that is configured to be selectively fitted to one of the plurality of positioning slits, and the plurality of positioning slits are arranged at equal intervals and the plurality of screw holes are arranged at the same intervals as the positioning slits.

2. The air cylinder according to claim 1, wherein:

the stopper includes a support block attached to the cylinder body and an adjustment bolt attached to the support block.

* * * * *